UNITED STATES PATENT OFFICE.

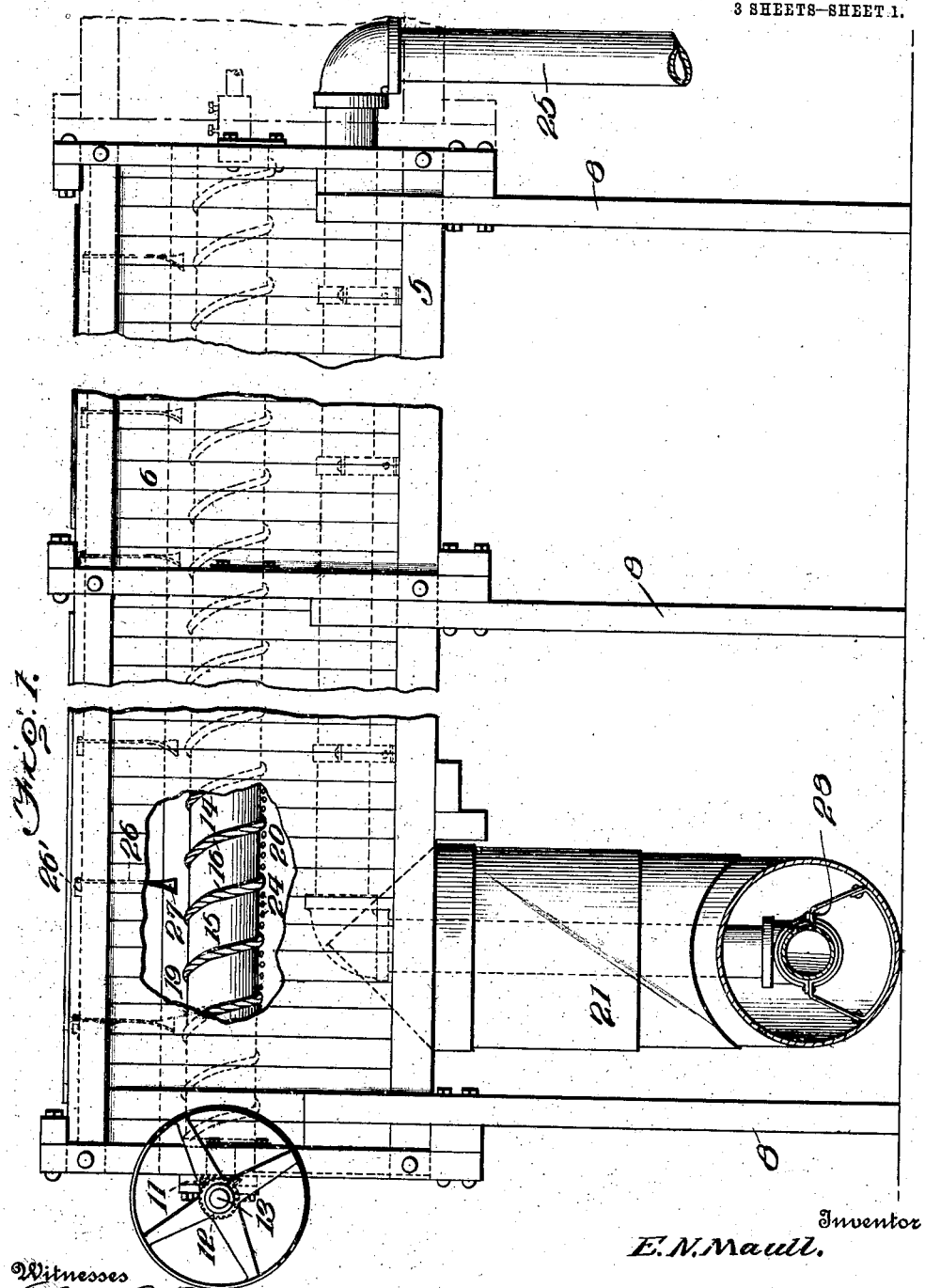

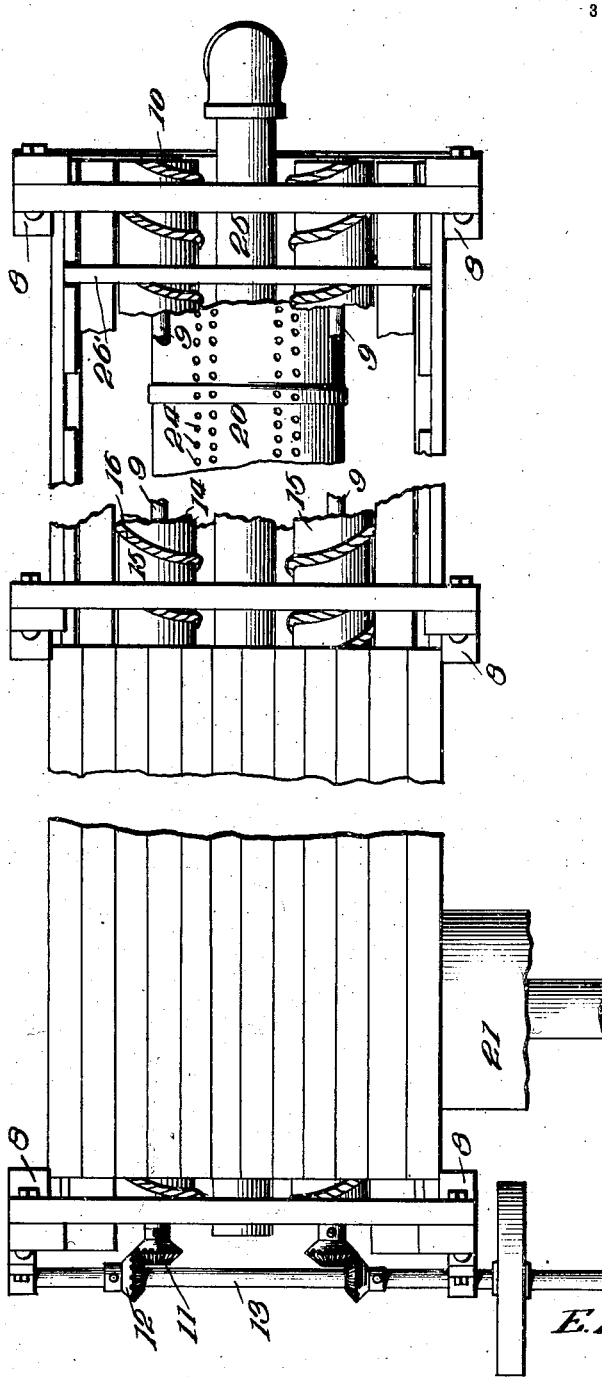

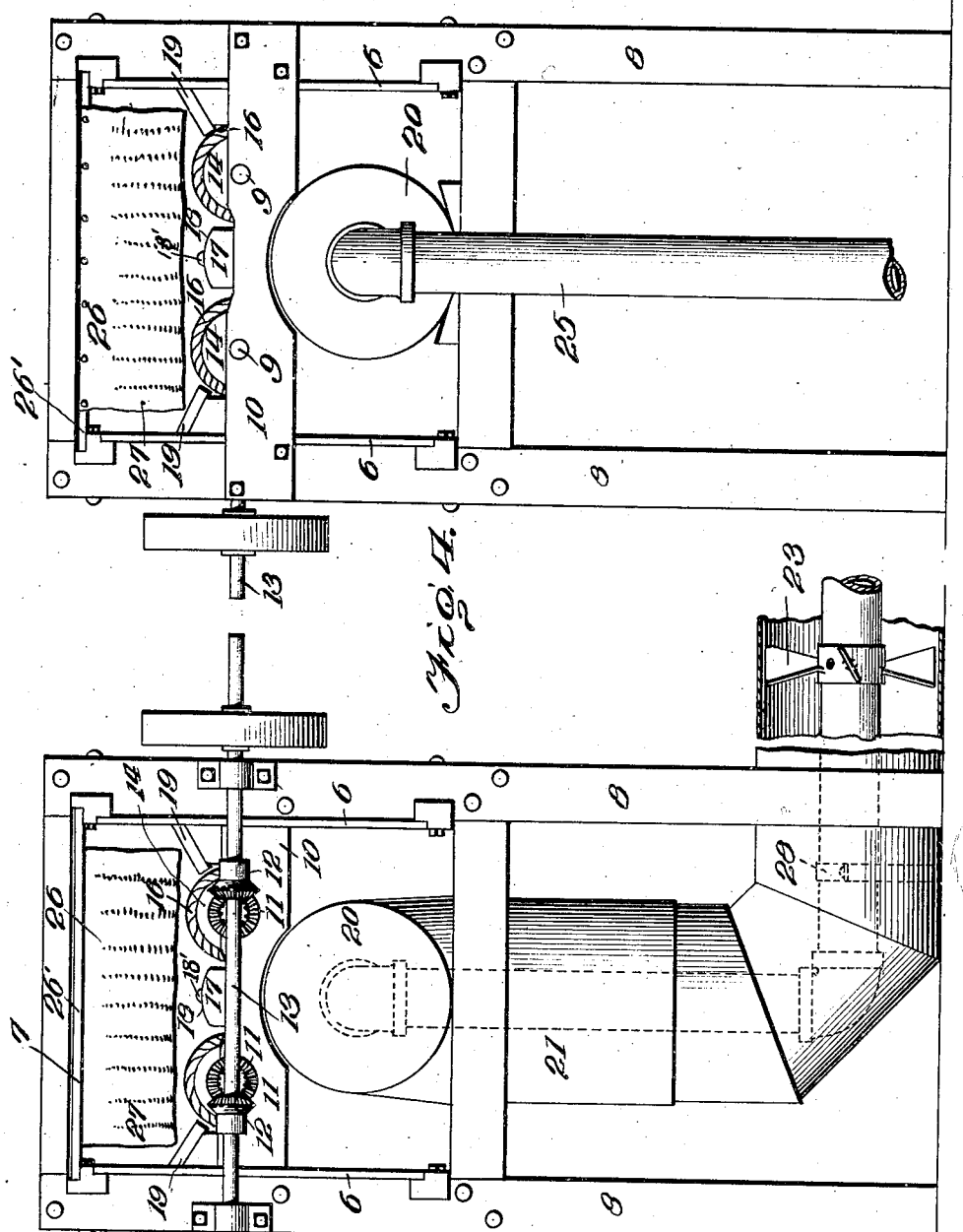

EDWARD N. MAULL, OF JACKSONVILLE, FLORIDA, ASSIGNOR TO J. P. CAMPBELL, OF JACKSONVILLE, FLORIDA.

FRUIT-DRIER.

1,101,304.   Specification of Letters Patent.   Patented June 23, 1914.

Application filed September 6, 1913. Serial No. 788,464.

*To all whom it may concern:*

Be it known that I, EDWARD N. MAULL, a citizen of the United States, residing at Jacksonville, in the county of Duval and State of Florida, have invented certain new and useful Improvements in Fruit-Driers, of which the following is a specification.

My invention relates to certain new and useful improvements in driers, and the particular object of my invention is to produce a machine for the rapid and complete drying of all kinds of washed fruits and particularly washed citrus fruits.

A further object of my invention is to produce a machine of this character which will be simple in construction and operation, highly efficient and economical in operation.

With the foregoing and other objects in view my invention consists in certain constructions, combinations and arrangements of parts, the preferred form of which will be first described in connection with the accompanying drawings and then the invention particularly pointed out in the appended claims.

Referring to the drawings wherein the same part is designated by the same reference numeral wherever it occurs, Figure 1 is a side elevation, partly broken away, of the preferred form of my invention; Fig. 2 is a top plan view, also partly broken away; Fig. 3 is a view of the right-hand end of Fig. 1, and Fig. 4 is a view of the left-hand end of Fig. 1.

5 designates the bottom of a box or casing, having side walls 6 and a top 7, whereby an inclosed box is formed, which however is preferably shown open at its ends. This box or trough is suitably supported on the legs 8.

9 designates a pair of shafts which are mounted in the transverse supports 10 at the ends of the box, and which extend parallel to each other for the entire length of the box. At one end these shafts are each provided with suitable driving mechanism, that shown being composed of a pair of beveled gears 11 on the ends of the shafts, which are engaged by beveled gears 12 carried on a shaft 13. The beveled gears 12 are shown as facing each other, in order to drive the shafts in opposite direction from each other. It is to be understood however that any other form of driving mechanism which will give the shafts a rotation in opposition to each other may be substituted for that shown and described without departing from my invention.

Mounted on each of the shafts 9 is a roller 14, formed of wood or other suitable material, each roller being preferably covered with a covering of cotton webbing, or other suitable material 15, to prevent the fruit from being injured while passing through the drier. Spirally wound around each roller and over the covering material 15 is a rope 16. The spirals of the rolls are wound in opposite directions as shown. Mounted between the rollers and extending parallel therewith is a wooden bar 17 which has the curved upper face 18 and an upwardly extending rib 18'; the bar with its ribs guide the oranges along the length of the rolls, as shown. Located on each side of the rollers are the inclined bars 19.

From the construction so far described it will be seen that when the rolls are driven in opposite directions because of the spiral rope and the webbing on the wooden roll, that the fruit will be carried along by these rolls, the rolls turning the fruit as it is fed along, thus causing all portions of the fruit to be exposed to the drying action.

While I have shown two rolls, it is to be understood that this number may be increased or diminished if desirable.

In order to heat the box up and evaporate the moisture picked up from and carried by the fruit, I provide means for supplying heat to the box or casing. In the form of my invention shown this is accomplished by providing a large pipe 20, which extends the length of the box or casing, the pipe at one end being extended down, as shown at 21, where it is provided with a suitable fan 23, to force air therethrough. The top portion of the pipe for its length along the box is preferably perforated, as shown at 24. The air supplied to the pipe 20 may be heated by any suitable heater or, if desired, and this I prefer, a pipe 25 may extend through the center of the pipe 20, being supported at intervals by suitable brackets 26 therein, said pipe 20 being the exhaust pipe from an internal combustion or other engine, whereby the heat of the exhaust gases is utilized to supply heat to the drier.

In order to wipe the fruit and thus assist in the drying operation, and at the same time aid in keeping the fruit properly on the rolls, I preferably provide a series of flaps 26 of linen or similar material mounted on cross bars 26′ which extend across the box above the rolls along the length thereof, the flaps being cut into a plurality of tongues 27, which extend into close proximity to the top of the rolls, as best shown in Fig. 4.

I am aware that considerable variation is possible in the details of construction herein shown and described, without departing from the spirit of my invention, and I do not intend to limit myself thereto, except as pointed out in the following claims, in which it is my intention to claim all the novelty inherent in the structure shown, and described as broadly as the state of the art will permit.

Having thus described my invention what I claim as new and desire to secure by Letters Patent is:

1. In a fruit drier the combination with a casing, of a roll mounted in the casing, a spiral of absorbent material wound on the roll, means located on each side of the roll for causing fruit to remain on the roll, means for rotating the roll and means for supplying heat to the casing.

2. In a fruit drier the combination with a casing, of a roll mounted in the casing, textile fabric covering the roll, a spiral of absorbent material wound on the fabric, means located on each side of the roll for causing fruit to remain on the roll, means for rotating the roll and means for supplying heat to the casing.

3. In a fruit drier the combination with a casing, of a pair of rolls spaced apart and mounted in the casing, a spiral of absorbent material wound on each roll, means for rotating the rolls in opposite directions and means for supplying heat to the casing.

4. In a fruit drier the combination with a casing, of means mounted in the casing for feeding fruit from one end to the other thereof, a perforated pipe located in the casing below the fruit feeding means, means for forcing air through the pipe, and a second pipe mounted within the first-mentioned pipe, said second pipe being adapted to be connected with a source of heat supply.

5. In a fruit drier the combination with a casing, of a pair of rolls spaced apart and mounted in the casing, a spiral of absorbent material wound on each roll, a strip located between the rolls, means for rotating the rolls in opposite directions, and means for supplying heat to the casing.

In testimony whereof I affix my signature in presence of two witnesses.

EDW. N. MAULL.

Witnesses:
FRIEDA WIEGANDT,
F. M. QURRANCEY.